Sept. 1, 1964   R. G. WHITE   3,146,730
METHOD AND APPARATUS FOR MAKING ROLLS
Filed Dec. 6, 1960   3 Sheets-Sheet 3

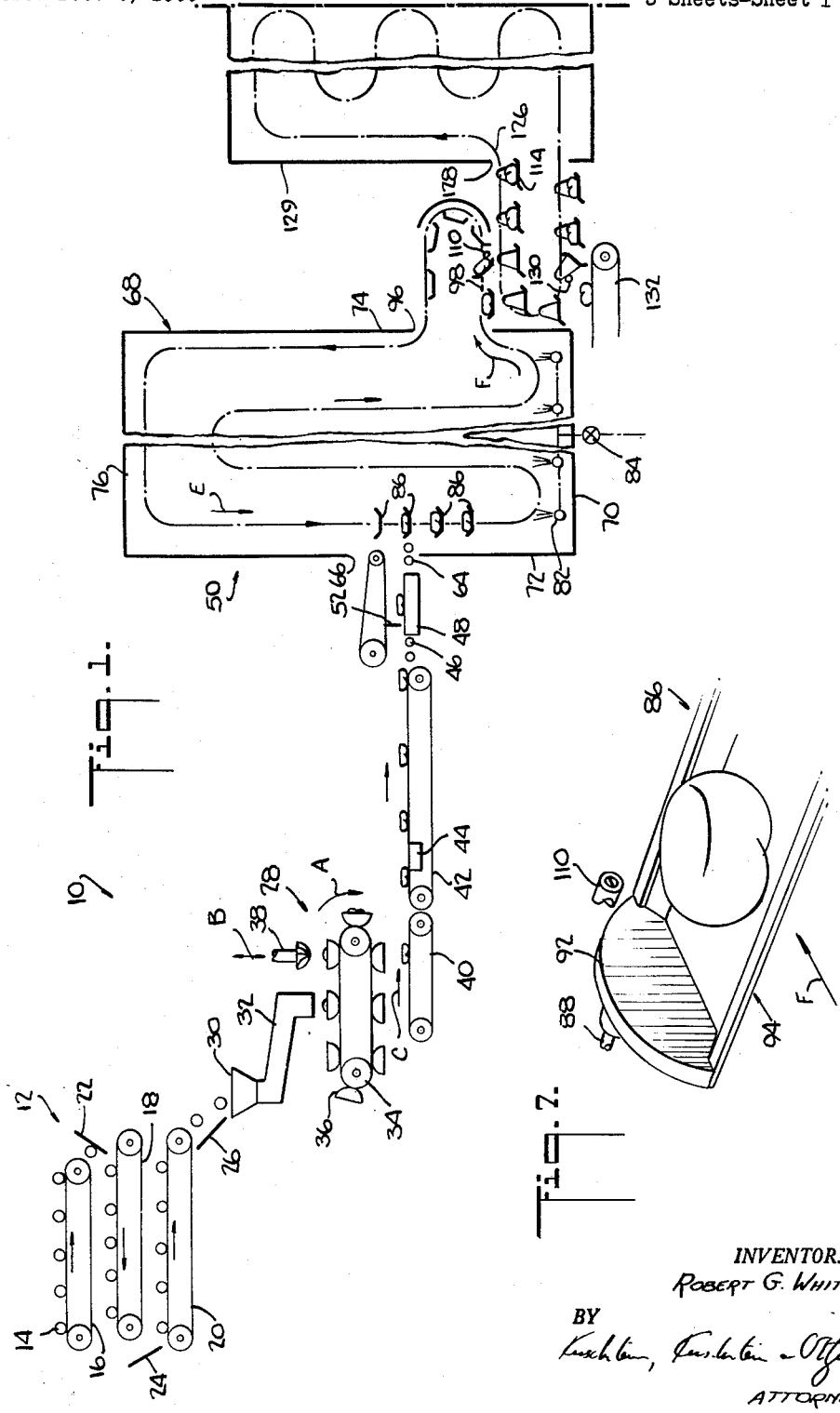

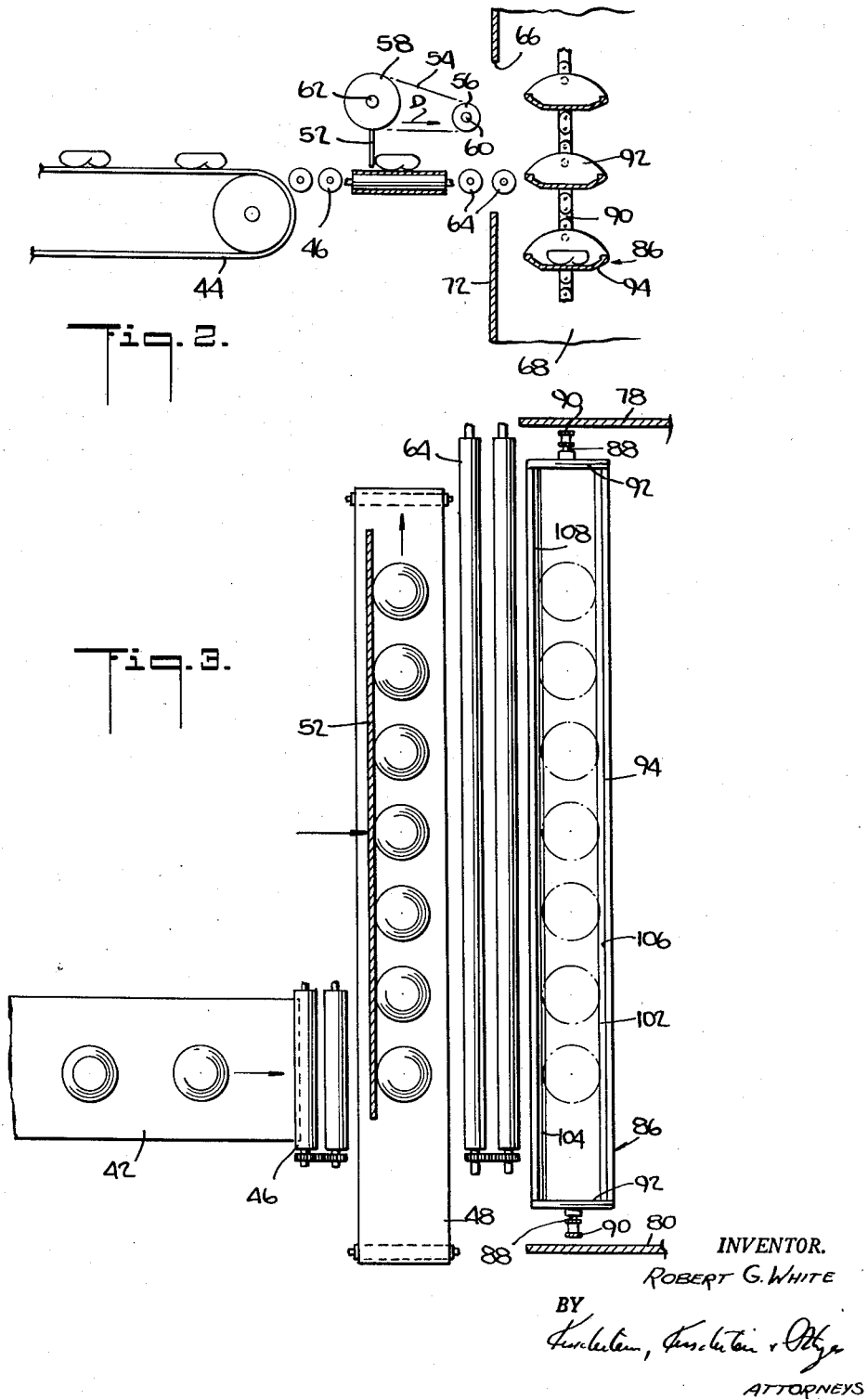

INVENTOR.
ROBERT G. WHITE
BY
ATTORNEYS

United States Patent Office 3,146,730
Patented Sept. 1, 1964

3,146,730
METHOD AND APPARATUS FOR MAKING ROLLS
Robert G. White, Massapequa, N.Y. (% R. G. White Manufacturing Corp., 101—18 97th Ave., Ozone Park 16, N.Y.)
Filed Dec. 6, 1960, Ser. No. 74,051
9 Claims. (Cl. 107—4)

This invention relates to a method and apparatus for making rolls, that is to say to a system which broadly embraces all of the steps leading to the manufacture of a finished roll. Such steps commence with mixing and kneading of the dough and progress through lumping the dough, i.e. dividing the dough into segments, balling the dough, i.e. rounding the segments into balls, dry-proofing the balls, finish-shaping the dry-proofed balls into rolls, wet-proofing the unbaked rolls and, finally, baking the wet-proofed rolls.

The invention in general is applicable to the manufacture of all kinds of rolls, these being generally categorized into two types recognized by the trade as "hard" and "soft" rolls. By way of example a typical hard roll is the well-known "Vienna" roll, and typical soft rolls are the well-known "frankfurter" rolls and "hamburger" rolls.

At the present time most rolls are made by either a semi-automatic or a full automatic process. In the semi-automatic process the rolls, after mixing, kneading, lumping, rounding, dry-proofing and finish-shaping, are placed on peels which are transferred by hand to racks and the racks are pushed by hand into wet-proofing chambers where they are allowed to remain for a proper length of time. Thereafter, the peels are transferred by hand into an oven. In a modified variation of the semi-automatic process pans are employed instead of peels. Customarily, when pans or peels are used hard rolls are inverted subsequent to wet-proofing and prior to insertion in an oven. If pans are employed, a second pan is placed over wet-proofed rolls on a first pan, the pans and rolls are inverted as a unit, and the first pan is removed.

In the automatic method the same steps are followed as in the semi-automatic pan process but automatic equipment handles the pans, by passing them through a wet-proofing chamber, placing the second pans over the first pans, inverting the pans, returning the first pans to receive freshly finish-shaped rolls and moving the second pans through a baking oven so that the manual handling of peels or pans is avoided.

Both of these systems, that is to say, the semi-automatic and automatic systems for making rolls are subject to several drawbacks. It is apparent that in the semi-automatic system the individual handling of peels or pans, the placement of peels or pans in racks, the pushing of racks into and then out of a wet-proofing chamber, the individual removal of peels or pans subsequent to wet-proofing, and the inverting of the rolls involved a great deal of manual labor and required considerable floor space. In both the semi-automatic and automatic systems a very large number of peels or pans were required. In particular when pans were used, after their passage through the wet-proofing chamber or the baking oven they were cooled and then returned for placement of freshly finish-shaped or freshly wet-proofed rolls thereon. This system involved a long idle time for the pans and, therefore, the use of a great many pans. Moreover, the pans had to be cooled prior to each such placement, thereby entailing a substantial heat loss when the pans were raised to wet-proofing or baking temperature once every cycle.

In addition, the pans that were used for wet-proofing were not maintained separate from the pans used for baking and this involved the necessity of frequent reglazing or resurfacing of the pans since the treatment which was satisfactory for wet-proofing was unsatisfactory for baking. During wet-proofing, the pans became damp; thereafter when they were subjected to baking heat they tended to oxidize and deteriorate.

Another difficulty present in both the automatic and semi-automatic systems for making rolls was that, as noted above, certain types of rolls, e.g. Vienna rolls, required inversion after wet-proofing and before baking. This involved careful handling, considerable mechanical equipment and sometimes doubling of the trays, e.g. placement of a baking tray over wet-proofed rolls on another tray and then inversion of the two trays with the wet-proofed rolls sandwiched therebetween.

An additional difficulty encountered in the previous systems was that during wet-proofing the dough which still was unbaked, tended to become quite tacky and to adhere to the peels or pans. It has been the practice in the trade to employ special surfacing methods, such for instance, as the placement of a loose glazing such as flour on the wet-proofing trays to facilitate removal of rolls therefrom at the end of wet-proofing. Where such surfacing methods were employed it was necessary to transfer the wet-proofed rolls to a cooled set of baking trays thus involving further handling and further waste of heat.

The cost of the many peels or pans in a semi-automatic or automatic roll making system is very high. Moreover, the cost of glazing, greasing or other surface treating of the peels or pans which must be carried out periodically and of the replacement of the peels or pans, is considerable.

It is an object of the present invention to avoid the foregoing drawbacks of existing semi-automatic and automatic roll making systems.

It is another object of the present invention to provide a roll making plant which eliminates the use of peels or pans, eliminates all manual handling, eliminates automatic handling devices, i.e. handling devices which pick up and subsequently discharge peels or pans and eliminates the heat waste, machinery and time involved in cooling trays after they have been raised to elevated temperatures.

It is another object of the present invention to provide a roll making plant of the character described which automatically transfers rolls into and out of a wet-proofer in small batches without the use of peels or pans, the rolls, if necessary, being inverted automatically in the process of transfer from the wet-proofer to a baking oven without the utilization of extraneous equipment to physically contact the wet-proofed rolls and turn them.

It is another object of the present invention to provide a roll making plant of the character described which isolates the wet-proofing roll-supporting equipment from the baking roll-supporting equipment so that the supporting equipment for each phase may be maintained at its own substantially uniform temperature and so that the glaze or surface treatment of such equipment in each phase may be specifically designed for that phase alone and will not be adversely affected by use in the other phase.

It is another object of the present invention to provide a roll making plant of the character described which is far more efficient in use of floor space, far lower in initial cost and far lower in maintenance than conventional present-day roll making plants.

It is another object of the present invention to provide a roll making plant of the character described in which the rolls from the start of wet-proofing to the end of baking are handled in single transverse rows, i.e. in which single transverse rows of rolls are progressively fed to and moved through a wet-proofing chamber and thereafter through a baking oven, being transferred, and inverted, if desired, during the transfer from the wet-proofing chamber to the baking oven, in one single transverse row at a time.

Other objects of this invention in part will be obvious and in part will be pointed out hereinafter.

The invention accordingly consists in the features of construction, combinations of elements, arrangements of parts and series of steps which will be exemplified in the plant and method hereinafter described, and of which the scope of application will be indicated in the appended claims.

In the accompanying drawings, in which is shown one of the various possible embodiments of this invention, FIG. 1 is an elevational schematic view of a roll baking plant constructed in accordance with the present invention;

FIG. 2 is a fragmentary partially sectional view of the portion of the plant where rolls are delivered from the finish-shaping equipment to the inlet end of the wet-proofing chamber;

FIG. 3 is a plan view of the portion of the plant shown in FIG. 2;

FIG. 7 is a fragmentary perspective view of a wet-proofing tray as it approaches the station at which rolls are transferred to a baking tray.

Figure 4:
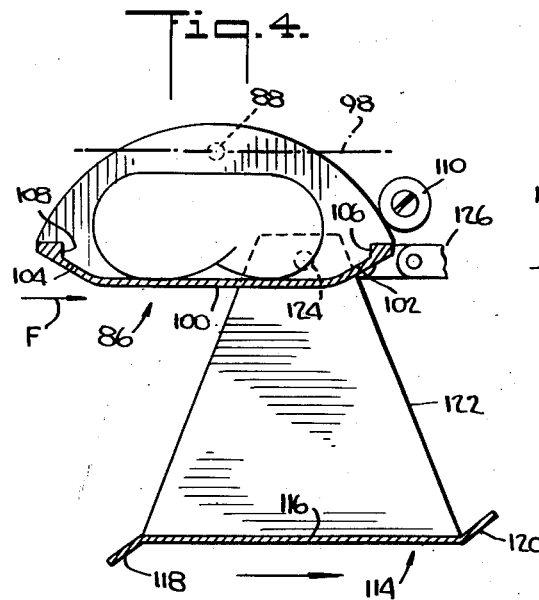
FIGS. 4, 5 and 6 are progressive sectional views taken at the station where rolls are transferred from the outlet end of the wet-proofing chamber to the inlet end of the baking oven.

Referring now in detail to the drawings, the reference numeral 10 denotes a roll making plant constructed in accordance with and embodying the present invention. The equipment used in the early stages of operation in said plant is not illustrated, since it is conventional and, in addition, has no bearing on the practice of the invention. However, it will be understood that this equipment includes a mixer in which the proper ingredients are blended, and a kneader in which the dough is worked, such equipment being standard in the manufacture of dough for rolls. The selection of the ingredients will depend on the type of roll which is to be made. It may be mentioned at this point that the invention as herein disclosed will be described in the making of a hard roll, and specifically of a Vienna roll, although the invention is not to be so limited except to the extent indicated in the appended claims.

After proper mixing and kneading by mass-production methods, the dough is separated into lumps of the proper weight by a divider and thereafter the lumps are fed into a rounder in which the lumps are rolled within annular hoops so as to form doughballs. Neither the divider nor rounder have been illustrated since they are conventional.

In the aforesaid handling of the dough, it has been kneaded and worked to a considerable extent and requires a rest period to recuperate and also to raise to some extent. Such rest treatment is effected in a dry-proofer 12 which likewise is conventional. Doughballs 14 are successively deposited in the dry-proofer from the rounder. As is customary, the dry-proofer 12 constitutes a series of endless conveyor belts 16, 18, 20 which are vertically stacked and are arranged to provide successive flat horizontal passes. At the end of the upper horizontal pass of each said conveyor belt the doughballs fall onto deflectors 22, 24 which guide them to the upper horizontal pass of the next lowermost conveyor belt. The flights conveniently are staggered to facilitate such successive transfer.

It will be appreciated that the number of endless conveyor belts herein shown, to wit, three, and their lengths, have been abbreviated for the purpose of illustration inasmuch as far greater lengths and many more conveyors are used to provide the proper time of dry-proofing treatment.

By way of example, the number of dry-proofing conveyor belts and their lengths and travel speeds may be such that it will take an individual doughball approximately twenty minutes to move from the inlet end of the dry-proofer to its outlet end, which latter constitutes a discharge deflector 26.

During dry-proofing the volume and dimensions of the doughballs are increased noticeably. At the end of dry-proofing the doughballs have slightly hard crusts and can be handled with comparative ease. They are somewhat fluffy and are not tacky.

The doughballs now are finish-shaped. If a short roll is to be made, and proper dough is used for the same, the finish-shaping will be such, for instance, as to elongate the doughball, as by rolling it about a progressively advancing axis, to form an elongated cylinder for the making of a frankfurter roll. Alternatively, the approximately spherical doughball may be flattened to form a pancake-like shape for the making of a hamburger roll.

In the example being described, Vienna rolls are being made and for this purpose there is employed a Vienna finish-shaper 28 the construction of which is well-known. Attention is called for instance, to the following United States Letters Patent which illustrate various details of Vienna roll finish-shapers; 1,741,694, 1,798,007, 1,834,474 and 2,212,999.

Specifically, the Vienna roll finish-shaper 28 includes a funnel 30 into which doughballs, delivered from the dry-proofer 12, fall. A guide chute 32 leads the doughballs from the funnel to a drop point directly above an endless conveyor belt 34. Said conveyor belt carries a series of cups 36 into one after another of which doughballs drop from the bottom end of the guide chute 32. The conveyor belt 34 intermittently moves in the direction indicated by the arrow A.

Each time the conveyor belt 34 is stationary, a dough shaping die 38 descends in the direction indicated by the arrow B so as to engage a doughball in the cup 36 then beneath the die. The shaping surface of the die 38 constitutes a plurality of helical fins. As the die 38 descends it rotates in the direction of the leading edges of the fins so as to cause said fins to turn as they enter the doughball and thereby form tucks in the upper surface of the doughball, this being characteristic of the configuration of a Vienna roll.

After the individual doughballs are thus successively shaped, they reach the discharge end of the conveyor belt 34 where the cups are turned and the now shaped doughballs are turned upside-down. As the cups are inverted they drop the shaped upside-down doughballs onto a receiving conveyor belt 40, the upper horizontal pass of which moves continuously in the direction indicated by the arrow C. The function of the conveyor belt 40 simply is to successively receive and move onward inverted doughballs which have been shaped by the die 38. Said conveyor belt 40 delivers the inverted doughballs to a seeding conveyor belt 42 which is perforated, e.g. of mesh construction. The upper horizontal pass of the seeding conveyor belt traverses a seed feeder 44 which forces seeds through the belt onto the top but then lowermost surfaces of the inverted shaped doughballs.

It is well known that during the finish-shaping of the dry-proofed doughballs their volume is materially compressed by deaeration thereof and that if the shaped doughballs are then placed in a baking oven the resulting rolls will be flat and tough and their surfaces will be scaly. In order to restore the finish-shaped doughballs to a proper size for baking by enabling the dough to rise or expand to somewhere near its final volume, to prepare the surface of the doughball for baking by softening the same, and also to accelerate the raising process and moisturize the roll, and particularly the skin thereof, it is usual to subject the shaped doughballs after finish-forming to a wet-proofing treatment. It should be mentioned that up to the point thus far described, that is to say, up to delivery of the shaped and seeded doughballs, the process as thus far described herein is entirely conventional and the present invention contemplates the treatment of the doughballs from this point forward. However, it has been deemed necessary to provide a short description of the conventional equipment used for dry-proofing and finish-shaping in order that the integration of wet-proofing and baking with the earlier steps may be appreciated.

Referring now to FIGS. 1, 2 and 3, the inverted finish-shaped doughballs are delivered by the seeding conveyor belt 42 to a pair of quick-transfer rollers 46 which are disposed in tandem athwart the path of travel of the upside-down shaped doughballs. It is proper to mention at this point that the conveyor belts 16, 18, 20 of the dry-proofer 12 are driven in synchronism with the conveyor belt 34 for the finish-shaper 28 inasmuch as one doughball at a time must be deposited on the intermittently movable conveyor belt 34. However, the conveyor belt 34 need not be driven in synchronism with the discharge conveyor belt 40 nor with the seeding conveyor belt 42 nor need the conveyor belts 40, 42 be driven in synchronism with one another although if desired these latter two belts may be synchronized. Furthermore, the seeding conveyor belt 42 is distinctly out of synchronism with the quick-transfer rollers 46. The linear speed of the quick-transfer rollers is substantially in excess of the linear speed of the seeding-conveyor belt 42 so that as upside-down shaped doughballs are shifted onto the transfer rollers 46 by the seeding conveyor belt 42 such rolls are quickly discharged from the transfer rollers 46 onto the next piece of equipment.

It will be appreciated that the average speed of the various conveyor belts for the dry-proofer 12 and the finish-shaper 28 is approximately the same so that about the same spacing intervals are maintained between round doughballs and shaped doughballs prior to wet-proofing. Accordingly, preferably all of these conveyor belts may be driven from a common source of power and it is simplest to maintain all belts having uniform speeds of movement synchronized. However, because the quick-transfer rollers 46 rotate at much higher speeds, these may be independently driven, if desired, by a separate source of power such as an individual electric motor (not shown).

The quick-transfer rollers 46 deliver the upside-down shaped and seeded doughballs to a transverse conveyor belt 48 having a horizontal upper pass which moves at right angles to the seed conveyor belt 42 and parallel to the axis of rotation of the quick-transfer rollers 46. Said upper pass of the transverse, i.e. cross, conveyor belt 48 is approximately in the same plane as the upper surface of the seed-conveyor belt 42 and the tops of the quick-transfer rollers. Desirably the cross conveyor belt 48 is driven at a speed somewhat less than the speed of the seed conveyor belt 42 so that as inverted finish-shaped seeded doughballs are deposited thereon one after another by the quick-transfer rollers 46 the spacing therebetween will be reduced. The speed of the belt 48 relative to the rate of delivery of shaped doughballs thereon is such that the spacing between the upside-down doughballs deposited thereon is sufficient to allow said doughballs to expand during wet-proofing without contacting one another.

The cross conveyor belt 48 should be considered to be a part of the wet-proofing device 50, to wit, the automatic feed-in mechanism for said wet-proofing device. Another part of this feed-in mechanism constitutes a sweep bar 52 which is suitable mounted for intermittent forward motion across the upper horizontal reach of the cross conveyor belt 48. The timing of the arrangement for intermittently moving the sweep bar is such that after a group of a predetermined number of inverted finish-shaped doughballs are deposited on the cross conveyor belt 48 said sweep bar will push all said doughballs of such group at right angles to the conveyor belt 48 whereby to discharge the group.

The arrangement for intermittently moving the sweep bar 52 as aforesaid comprises a pair of chains 54, one at each end of the sweep bar and secured to the associated end of said bar. The two chains move in synchronism so that the sweep bar will remain parallel to the direction of travel of the upper horizontal pass of the cross conveyor belt 48. Each chain 54 is trained about a pair of sprockets 56, 58 the two front sprockets 56 being mounted on a common shaft 60 and the two rear sprockets 58 being mounted on a different common shaft 62. One of the shafts is driven and the other idles. The chains 54 thereby are turned in the direction indicated by the arrow D. The sweep bar 52 hangs (swings) from the chains 54 so that it will maintain a vertical position.

It will be apparent that during a considerable part of the travel of the sweep bar, to wit, as it is raised around the sprockets 56, as it is moved rearwardly, and as it is lowered around the sprockets 58, the sweep bar is idle, i.e., out of contact with the inverted shaped doughballs on the cross conveyor belt. The drive for moving the sweep bar is so timed that the aforesaid idle portion of the travel of the sweep bar when it is out of contact wtih said shaped doughballs is sufficiently long to permit delivery of the required number of upside-down finish-shaped doughballs onto the cross conveyor belt and the active portion of the path of travel of the sweep bar is so located as to enable the sweep bar to push said doughballs off the cross conveyor belt. The chains 54 are driven at such a rate of speed that the sweep bar will push a group of doughballs off the cross conveyor belt in the interval between delivery of successive inverted shaped doughballs from the seed conveyor belt 42 to the cross conveyor belt 48.

It will be appreciated that the sweep bar thus pushes off the cross conveyor belt a single transverse row (linear batch) of inverted finish-shaped doughballs at a time.

The aforesaid single transverse row of inverted shaped doughballs discharged from the cross conveyor belt 48 is deposited on a pair of quick-transfer rollers 64 located in front of the cross conveyor belt. The quick-transfer rollers 64, like the quick-transfer rollers 46, turn rapidly so that rolls deposited thereon are quickly delivered therefrom, the transition taking place in a fraction of a second. The rollers 64 therefore may be independently driven by an individual electric motor since synchronization of the rollers 64 with any other moving parts is not required.

The feed-in mechanism for the wet-proofing device 50 will thus be seen to constitute the cross conveyor belt 48 for batching the doughballs, that is to say, for arranging the upside-down finish-shaped doughballs in successive single transverse rows, the sweep bar 52 and the quick-transfer rollers 64. Said feed-in mechanism is located in front of an inlet opening 66 of a wet-proofing chamber 68 which is defined by a bottom wall 70, a front wall 72, a rear wall 74, a roof 76 and side walls 78, 80. Said chamber is maintained at a suitable temperature and a suitable humidity for wet-proofing. Typically the temperature will range from 105° to 130° F. and the relative humidity from 95% to 100%. The requisite temperature is obtained with electric heaters or steam coils (not shown) and the desired humidity is secured by injecting steam directly into the chamber 68. Such source of humidity is schematically indicated by the perforated steam coils 82 the same being controlled for regulation by a valve 84. It will be understood that the wet-proofing conditions are conventional and are well-known in the art. They will be varied from bakery to bakery depending upon the bakers' experiences, upon customer requirements, upon the ingredients of the doughs and upon the desired duration of the wet-proofing treatments.

Within the wet-proofing chamber 68 there are provided a plurality of elongated trays 86 from the opposite ends of each of which aligned trunnions 88 extend. Said trunnions are freely pivotally connected to spaced pins of endless conveyor chains 90 located on opposite sides of the wet-proofing chamber. The two conveyor chains 90 are identical and are trained about registered sprockets (not shown) for identical movement in a closed path through the wet-proofing chamber. This movement is such that the wet-proofing trays 86 will travel in successive vertical passes and thus progressively advance through the wet-proofing chamber in a tortuous path from inlet to outlet and a short path back to the inlet. The lengths of the vertical passes and the speed at which the conveyor trays are moved are so correlated that the desired time of wet-proofing treatment will be secured.

Each wet-proofing tray 86 comprises a pair of end plates 92 and a shaped bottom plate 94. The trunnions 88 are located on the end plates 92 in a position above the center of gravity of the trays 86 so that the bottom plate 94 will swing to a lowermost position. That is to say, the bottom plate 94 normally will be the lowest part of each tray unless the equilibrium of the wet-proofing tray is disturbed. Moreover the wet-proofing trays are so proportioned that when they hang by the trunnions 88 the bottom plates 94 will be substantially horizontal.

The first vertical pass of the wet-proofing trays 86 is directly in front of the inlet opening 66 to the wet-proofing chamber and in this pass successive trays 86 descend directly in front of the quick-transfer rollers 64. The drives for the sweep bar chains 54 and the wet-proofing conveyor chains 90 are synchronized so that as the sweep bar 52 pushes a single transverse row of upside-down finish-shaped doughballs off the cross conveyor belt said row will be shifted by said quick-transfer rollers 64 to a wet-proofing tray 86 which at that moment is substantially level with or slightly below the quick-transfer rollers whereby said single transverse row of doughballs will be deposited as a group onto the wet-proofing tray then at the inlet opening 66. The wet-proofing trays 86 move in the direction indicated by the arrow E and as the next tray 86 is presented to the inlet opening 66 it will be filled by the next group of doughballs swept off the cross conveyor bar by the sweep bar 52. Thus successive elongated wet-proofing trays will be filled, one at a time, with single transverse rows of inverted finish-shaped doughballs.

The path and speed of travel of the wet-proofing trays 86 is such that after a suitable length of time the trays merge from the rear wall 74 of the wet-proofing chamber 68 through an outlet opening 96. At this time the trays 86 and conveyor chains 90 are moving along a horizontal path indicated by the reference numeral 98 in the direction indicated by the arrow F. The doughballs now will have been wet-proofed and will have swelled appreciably due to raising of the dough and their surface will have softened due to exposure to steam. The surface moreover is quite tacky.

Suitable means is included to discharge one after another of the single transverse rows of wet-proofed inverted finish shaped swollen doughballs from the wet-proofing trays 86 and, in the case of hard, e.g. Vienna rolls, to reerect the swollen doughballs, i.e. to restore them to their normal bottomside-down position.

To better appreciate the means for reerecting the doughballs it is necessary to detail the construction of the bottom plates 94 of the wet-proofing trays. As most clearly shown in FIG. 4, each bottom plate comprises a flat horizontal central portion 100, the front and back edges of which are upturned in the form of sloped wings 102, 104 respectively. The free longitudinal edges of the wings are formed with internal squat shoulders 106, 108. It may be mentioned that in the form of the invention now being described, only the front wing 102 and front shoulder 106 are operative. However, for symmetry of construction, to simplify balancing of the wet-proofing trays 86 and to make the design of their extrusion dies less costly (the bottom plates 94 desirably are aluminum extrusions), said bottom plates are provided with the rear upwardly inclined wings 104 and the rear shoulders 108.

The transverse row of shaped doughballs in any given wet-proofing tray is located on the flat horizontal central portion 100 so long as this portion is lowermost; that is to say, so long as the equilibrium of the freely-swinging hanging tray 86 is not disturbed. At the discharge, i.e. outlet, end of the wet-proofing device 50, as the trays 86 are moving along the horizontal path 98, they strike a transverse pin 110 disposed in the path of travel of the end walls 92. The pin 110 is below the horizontal path of travel of the trunnions 88 and is stationary so that when it is struck by an end wall the pin will disturb the equilibrium of the associated wet-proofing tray 86. Accordingly, as the wet-proofing tray is moved by the two conveyor chains 90, the leading wing 102 of the tray will be deflected downwardly and rearwardly with respect to the trunnions 88 causing the tray to rotate so that the bottom plate 94, and more specifically the central portion 100, gradually swings to a vertical position as indicated in FIG. 5.

Figure 5:
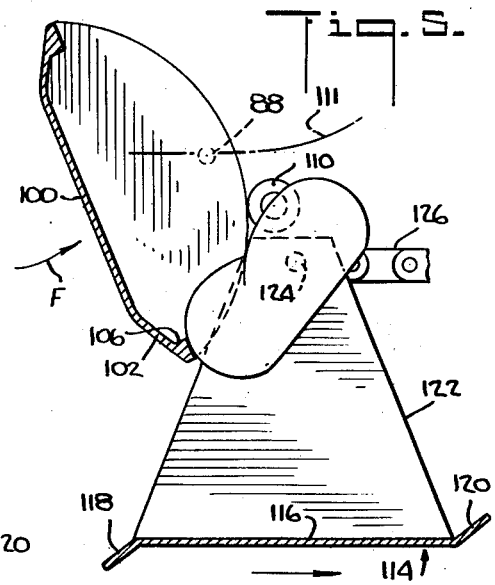

As a wet-proofing tray moves from its equilibrium position shown in FIG. 4 to the position shown in FIG. 5, the single transverse row of wet-proofed upside-down finish shaped swollen doughballs will slide down the central portion 100 of the bottom plate 94 and thereupon along the leading wing 102 until the doughballs reach the squat leading shoulder 106. The doughballs will then turn about said shoulder and the rolling action thus imparted will spin the entire row of doughballs as indicated in FIG. 5, thus performing the desired reinverting action.

Figure 6:
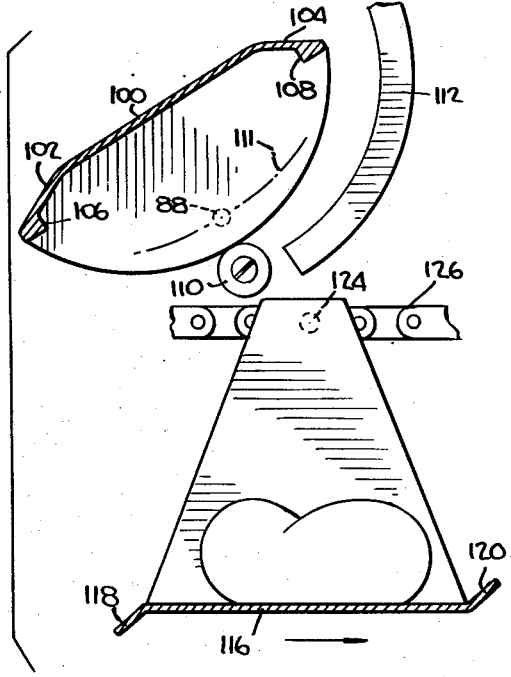
Figure 8:
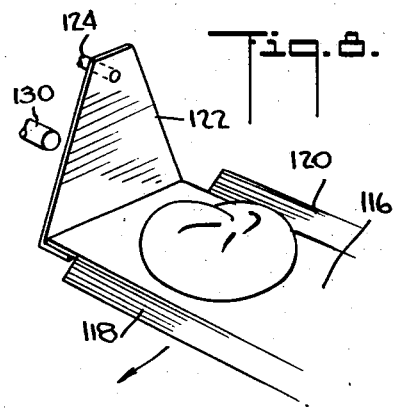
FIG. 8 is a fragmentary perspective view of a baking tray as it approaches the station at which rolls are discharged.

After the doughballs have been discharged from any given wet-proofing tray, the now empty tray is led upwardly along a curved path 111 and the tray is held in upside-down position, i.e. is not permitted to swing to its normal equilibrium position, by engagement of the curved upper edge of the end plate 92 with a curved stationary track 112, FIG. 6. The curved track covers an arc of approximately 180° so that it gradually reerects the empty tray 86 whereby when said tray disengages from the track it once more is right-side-up in equilibrium position and is led back into the wet-proofing chamber 68. The chains 90 are directed by suitable supports to lead the trays along the curved path 111.

Attention is particularly called to the fact that the trays are out of the wet-proofing chamber for a very short period of time, for example, in the order of less than fifteen seconds, so that the wet-proofing trays are not noticeably cooled and there is, therefore, very little heat lost by their brief exposure to the ambient atmosphere. At all other times the trays are within the wet-proofing chamber 68 where they are maintained at a substantially constant temperature and under the same substantially constant environmental condition. The trays therefore can be designed for this condition alone inasmuch as they do not have to be subjected to baking heat. The trays preferably are covered with a loose glazing such as flour or coarse ground wheat to expedite discharge of wet-proofed doughballs therefrom when the trays are turned and this glazing will not be deleteriously affected by subjection to baking heat.

As the wet-proofed finish-shaped erect doughballs are discharged, a single transverse row at a time from one after another wet-proofing tray, they are deposited one after another on elongated oven trays 114, said oven trays being synchronized as to speed and position with the wet-proofing trays as the latter move along the path 98. The oven trays move beneath the wet-proofing trays in proper location to receive, i.e. intercept, the reerected wet-proofed shaped doughballs while they still are turning and falling and at the moment that the bottoms of said doughballs are lowermost and substantially horizontal.

Each oven tray has a horizontal flat bottom 116, a down-turned edge 118 and an upturned edge 120. The ends of the bottoms are upturned to form side walls 122 each of which is provided with a trunnion 124. The trunnions of each tray are aligned and freely pivoted on endless conveyor chains 126 which move the oven trays along a desired path of travel.

The oven trays are made of a material which will withstand the rigors of the high ambient temperature in a baking oven. For example, said oven trays are made of sheet steel. The trays desirably are glazed with a releasing compound such for instance as a silicone resin. The oven trays hang from the conveyor chains 126 by the trunnions 124 and normally assume the equilibrium position shown in FIGS. 4, 5 and 6 wherein the bottoms 116 are horizontal and lowermost.

The conveyor chains 126 move the oven trays 114 through a path of travel which, after reception of wet-proofed doughballs leads through an opening 128 in the front wall of a baking oven 129. The temperature within said oven is suitably maintained, e.g., by flue tubes, and is correct for baking. It will depend upon the experience of the bakers, customer requirements, speed of travel of the oven trays and the ingredients of the doughs. Typically, the temperature will range from about 375° to 425° F. The path of travel is fairly lengthy so that the shaped doughballs will be left in the oven for a period suitable for baking, e.g., twenty minutes, and thereby become transformed into rolls.

The path of travel of the oven trays through the oven may include a series of either vertical or horizontal passes, horizontal passes being conventional and preferred, and after the last horizontal pass the oven trays are guided out of the oven through the same opening 128 as that through which they entered.

A pin 130 is disposed in the path of travel of one of the sides 122 of each oven tray and below the trunnions 124 so that as successive oven trays strike the pin they will be tilted to allow the row of baked rolls to fall under the influence of gravity off the bottom walls of the trays onto a take-away conveyor belt 132.

It will be appreciated that the oven trays and wet-proofing trays are moved at the same rate of speed so that at the point of transfer from the wet-proofing trays to the oven trays one oven tray will be presented to the single transverse row of wet-proofed swollen re-erected shaped doughballs each time that a wet-proofing tray is tilted. It also will be appreciated that pursuant to the present invention the individual oven trays are elongated in the same fashion as the individual wet-proofing trays so that each oven tray receives but a single transverse row of doughballs and carries but a single transverse row of doughballs through the baking oven. Furthermore, it will be appreciated that the heated oven trays are exposed to room temperature for only a few seconds so that heat loss is extremely small.

It thus will be seen that there is provided a device and method which achieve the several objects of this invention and are well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described the invention, there is claimed as new and desired to be secured by Letters Patent:

1. A method of making rolls from dry-proofed finish-shaped doughballs delivered successively from a finish-shaper, said method comprising accumulating said successively delivered finish-shaped dry-proofed doughballs in successive single groups of single file transverse rows, horizontally transversely pushing single transverse rows of said finish-shaped dry-proofed doughballs, one single file row at a time, onto elongated wet-proofing trays which receive said finish-shaped dry-proofed doughballs, one single file row per tray, progressively moving said wet-proofing trays through a wet-proofing chamber, thereafter progressively tilting the wet-proofing trays in a fashion such as to drop the wet-proofed single transverse rows of doughballs, one single file row at a time, onto oven trays which are successively below and registered with the wet-proofing trays being tilted and which receive said wet-proofed doughballs, one single file row on each tray, then progressively moving said oven trays through a baking oven, and wherein the wet-proofed doughballs are slid off the wet-proofed trays as the trays are tilted, so as to drop said doughballs from the wet-proofing trays by gravity onto the oven trays, and wherein the finish-shaped dry-proofed doughballs are placed on the wet-proofing trays in inverted position and wherein, as the inverted wet-proofed finish-shaped doughballs are slid off the wet-proofed trays, they strike an obstruction, which is low in comparison with the heights of the wet-proofed doughballs, so that the doughballs are spun and are reerected as they are deposited on the oven trays.

2. In a method of making rolls wherein finish-shaped wet-proofed doughballs are supported in inverted position on wet-proofing trays, that improvement comprising the steps of tilting the wet-proofing trays so as to slide inverted wet-proofed doughballs therefrom, placing an obstruction in the path of travel of the sliding doughballs so as to start the doughballs turning, and positioning oven trays in the path of travel of the falling and spinning wet-proofed doughballs in a position to intercept the doughballs as they are reerected.

3. An apparatus for making rolls from dry-proofed finish-shaped doughballs delivered successively from a finish-shaper, said apparatus comprising means progressively accumulating said successively delivered finish-shaped dry-proofed doughballs in successive single groups of single file transverse rows, a plurality of elongated wet-proofing trays, means progressively horizontally transversely pushing single transverse rows of said finish-shaped dry-proofed doughballs, one single file row at a time, onto said elongated wet-proofing trays which are positioned to receive said finish-shaped dry-proofed doughballs, one single file row per tray, a wet-proofing chamber, means progressively moving said wet-proofing trays through said wet-proofing chamber, a plurality of oven trays, means progressively tilting the wet-proofing trays in a fashion such as to slide the wet-proofed finish-shaped doughballs off the wet-proofing trays and drop the wet-proofed single transverse rows of doughballs, one single file row at a time, onto said oven trays, which are successively below and registered with the wet-proofing trays being tilted and which receive said wet-proofed doughballs, one single file row on each tray, a baking oven, means progressively moving said oven trays through said baking oven, and an obstruction, which is low in comparison with the heights of the wet-proofed doughballs, disposed in the path of travel of said wet-proofed doughballs as they slide off the wet-proofing trays, so as to spin the doughballs as they fall onto the oven trays.

4. An apparatus as set forth in claim 3 wherein there are plural obstructions each one forming part of a different wet-proofing tray.

5. An apparatus as set forth in claim 4 wherein each wet-proofing tray has an inclined wing extending along a longitudinal edge thereof and along which a row of doughballs slide when the wet-proofing tray is tilted, each obstruction being located on a wing of a different tray.

6. An apparatus as set forth in claim 3 wherein the means moving the wet-proofing tray and the means moving the oven trays move said trays through paths of travel which are substantially entirely located within the wet-proofing chamber and the baking oven respectively, and wherein said paths of travel of wet-proofing trays and oven trays are arranged to partially overlap outside of the wet-proofing chamber and the baking oven.

7. An apparatus as set forth in claim 6 wherein the tilting means for the wet-proofing trays is located at said overlapping portions of the paths of travel.

8. The method of operating a wet-proofer in coaction with a baking oven which comprises:
   (a) collecting items conditioned for wet-proofing in a sequence of relatively long narrow individual rows;
   (b) conveying the individual rows, closely spaced laterally, in the direction of their narrow dimension, each as a unit, into, through and out of the wet-proofer;
   (c) transferring each individual row as a unit in sequence for baking while in continuous motion through a short connecting space;
   (d) conveying the individual rows, closely spaced laterally, in the direction of their narrow dimension, as a unit, into, through and out of the oven;
   (e) delivering each individual row in succession substantially simultaneously with its emergence from the oven.

9. The method of operating a wet-proofer in coaction with a baking oven which comprises:
   (a) collecting inverted items for wet-proofing in a succession of long single transverse rows;
   (b) conveying the individual rows, closely laterally, in the direction of their narrow dimension, each as a unit, into, through and out of the wet-proofer;
   (c) transferring each individual row as a unit in sequence for baking, while simultaneously reorienting all the inverted units in the row, while in continuous motion through a short connecting space;
   (d) conveying the individual rows, closely spaced laterally, in the direction of their narrow dimension, as a unit, into, through and out of the oven;
   (e) delivering each individual row in succession substantially simultaneously with its emergence from the oven.

References Cited in the file of this patent

UNITED STATES PATENTS

| | | |
|---|---|---|
| 1,025,914 | Hicks | Mar. 7, 1912 |
| 1,751,312 | Ehrhart | Mar. 18, 1930 |
| 2,514,348 | Meinerding | July 4, 1950 |
| 3,054,498 | Baker | Sept. 18, 1962 |

FOREIGN PATENTS

| | | |
|---|---|---|
| 13,066 | Great Britain | May 27, 1914 |
| 347,583 | Great Britain | Apr. 27, 1931 |